United States Patent [19]  
Hinds, Jr.

[11] 3,904,779  
[45] Sept. 9, 1975

[54] WASHING AND COOLING COTTAGE CHEESE CURD

[75] Inventor: Horace Hinds, Jr., Mountain View, Calif.

[73] Assignee: Grace Machinery Company, Inc., Santa Rosa, Calif.

[22] Filed: July 2, 1973

[21] Appl. No.: 375,820

Related U.S. Application Data

[62] Division of Ser. No. 126,079, March 19, 1971, Pat. No. 3,791,630.

[52] U.S. Cl. .................. 426/431; 99/455; 134/133; 426/361; 426/478; 426/491; 426/506; 426/524
[51] Int. Cl.² ..................... A23C 19/02; A23L 1/00
[58] Field of Search ........... 426/361, 425, 431, 478, 426/491, 495, 524, 506; 99/452, 455, 456, 460; 259/4; 134/133

[56] References Cited
UNITED STATES PATENTS

| | | | |
|---|---|---|---|
| 3,044,863 | 7/1962 | Osborne et al. | 426/506 |
| 3,559,287 | 2/1971 | Bronkhorst | 99/458 |
| 3,606,683 | 9/1971 | Joux et al. | 426/491 |
| 3,791,630 | 2/1974 | Hinds, Jr. | 99/455 X |

*Primary Examiner*—David M. Naff  
*Attorney, Agent, or Firm*—Flehr, Hohbach, Test, Albritton & Herbert

[57] ABSTRACT

Process and apparatus for separating, washing and/or cooling food products wherein food particles transported in a fluid are introduced into the lower portion of a processing chamber. Fluid is passed upwardly through the particles and removed from the upper portion of the chamber, while the particles remain in the lower portion of the chamber. The particles are cooled by washing them with fluids at successively lower temperatures, and a single volume of fluid can be used for successive washes to minimize waste disposal, or to result in so little waste that it could be concentrated and dried.

9 Claims, 7 Drawing Figures

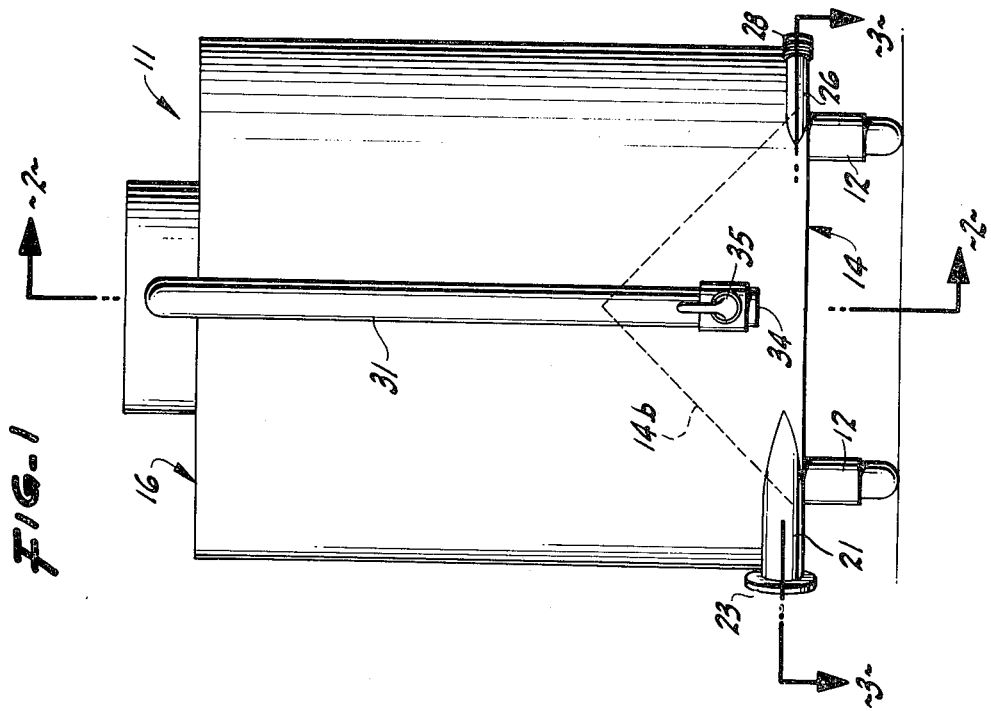
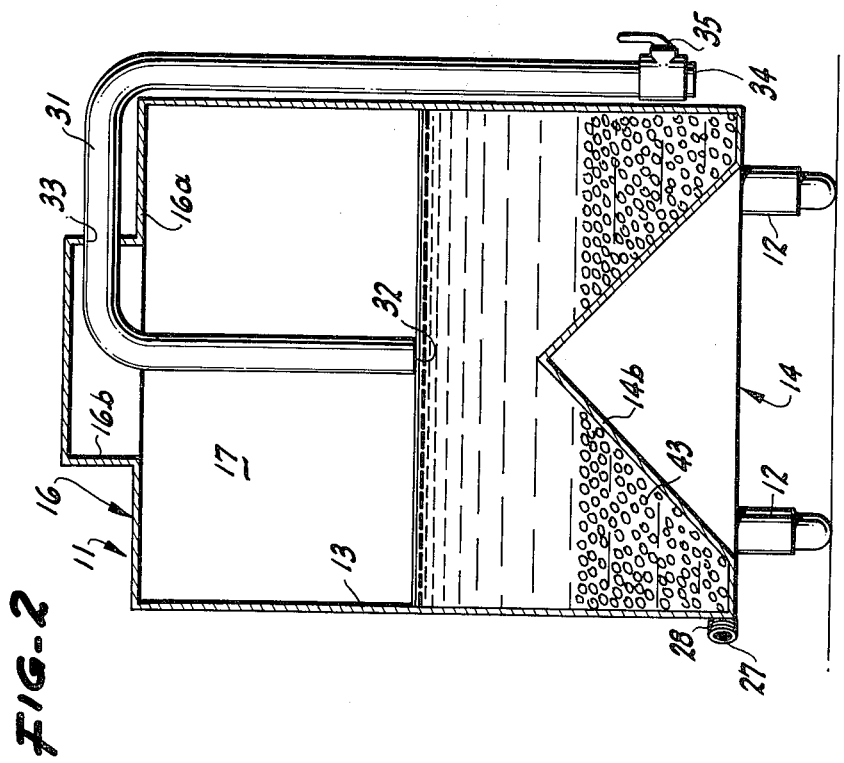

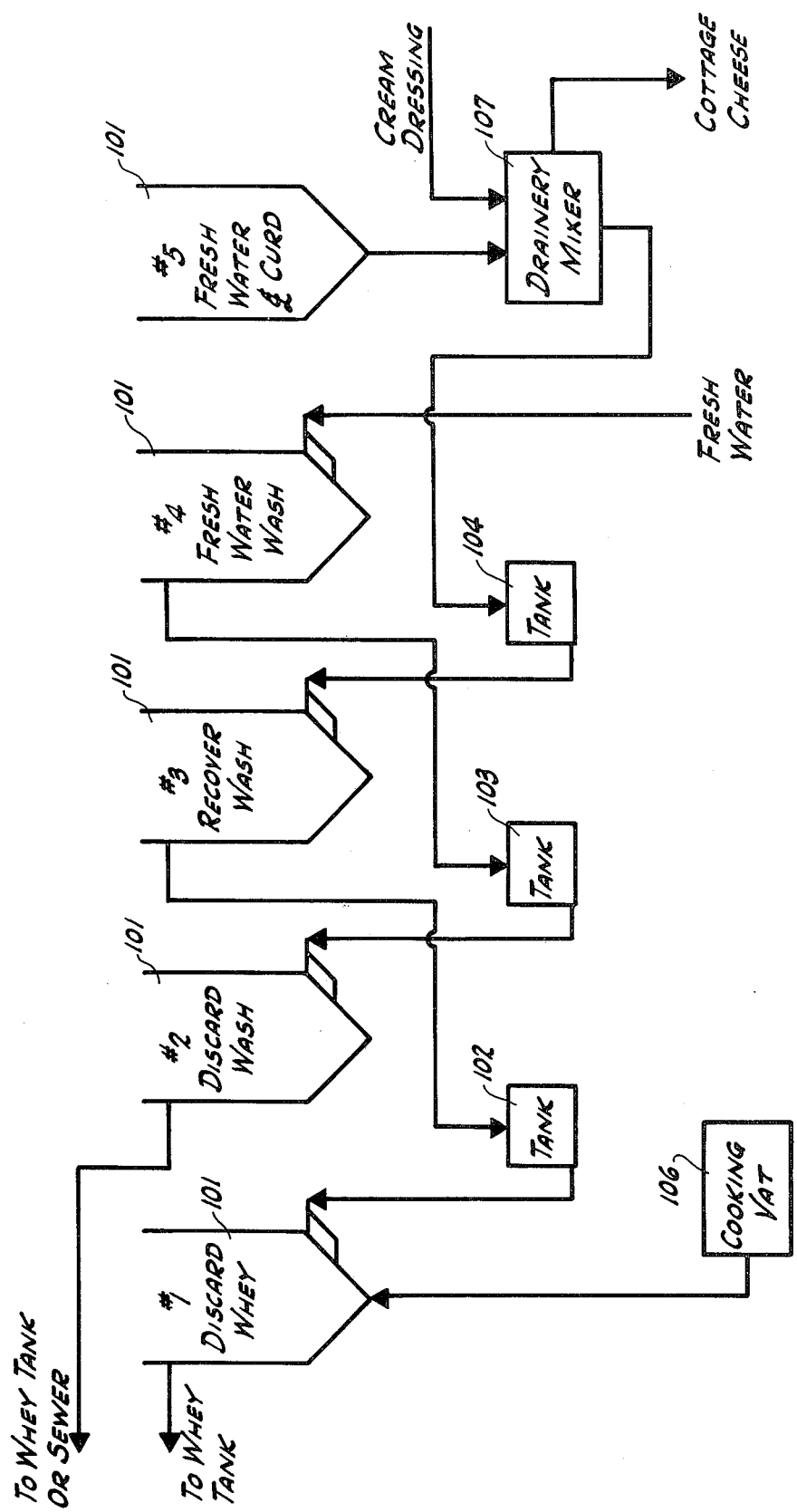

WASHING AND COOLING COTTAGE CHEESE CURD

This is a division of application Ser. No. 126,079, filed Mar. 19, 1971, now U.S. Pat. No. 3,791,630, issued Feb. 12, 1974.

BACKGROUND OF THE INVENTION

In systems heretofore provided for cooling and washing solid food particles and separating such particles from liquids, the solid particles are generally retained by a strainer or like device, and the liquids are removed by force of gravity. Washing is generally accomplished by adding wash water to the particles in a container such as a vat with stirring and then draining the water through the particles and out of the vat through the strainer. The particles are typically removed from the vat by a scoop or similar device, although in some instances they are pumped out with the wash water to a special external gravity drainer.

With these conventional systems, large quantities of water added with stirring are required to provide successive washings and coolings of the particles. Typically, each of the washings and coolings requires a volume of water of a size on the order of the volume of the vat. Washing and cooling in this manner is inefficient, it requires large batches of prepared water, and it results in large quantities of waste which must be disposed of.

Also, with the conventional, separating, washing and cooling systems, the food particles have a tendency to be broken during the mixing with water then compacted together in the vat, damaging the particles and inhibiting the drainage of liquid therefrom. When the particles are compacted in some areas, the wash water cannot pass freely between them, and it therefore flows around such masses of particles. There is a tendency for the finer particles to pass through the openings in the strainer and for the larger particles to clog the openings, thereby further inhibiting the drainage and washing action. In addition, the particles are frequently damaged by the scoop with which they are removed from the vat.

There is, therefore, a need for a new and improved process and apparatus for separating, washing and/or cooling food particles which overcome the foregoing and other disadvantages of systems heretofore provided.

SUMMARY AND OBJECTS OF THE INVENTION

The present invention provides a process and apparatus in which solid food particles transported in a fluid are introduced into the lower portion of a processing chamber. Washing fluid is likewise, later introduced into the lower portion of the chamber and passed upwardly through the food particles. The fluid displaces liquid, such as whey, from the voids between the particles, and the fluid and displaced liquid are removed from the upper portion of the chamber. The washed food particles are removed from the lower portion of the chamber. The washing operation can be repeated with fluids of successively or progressively lower temperatures to provide cooling of the food particles, as desired. Portions of the wash water used may be recovered and reused in successive washes until it is no longer useful for washing. As the wash water is reused, it progresses in a direction counter to the direction of wash improvement and temperature reduction.

It is in general an object of the invention to provide a new and improved process and apparatus for washing and/or cooling solid food particles and/or separating food solids and liquids.

Another object of the invention is to provide a process and apparatus of the above character which provide more efficient washing and cooling than has heretofore been possible.

Another object of the invention is to provide a process and apparatus of the above character in which the food particles are introduced into the lower portion of a processing chamber.

Another object of the invention is to provide a process and apparatus of the above character in which fluid is passed upwardly through the food particles and removed from the upper portion of the chamber.

Another object of the invention is to provide a process and apparatus of the above character in which food particles can be washed and cooled by fluids of progressively lower temperatures.

Another object of the invention is to provide a process and apparatus of the above character in which a fresh, small amount of fluid is recovered and used for successive washes, thereby minimizing the waste which must be disposed of, and even permitting its recovery, as in whey.

Another object of the invention is to provide a process and apparatus of the above character in which atmospheric air and contamination are excluded from the chamber in which the food is processed.

Another object of the invention is to provide a process and apparatus of the above character in which the food product is kept immersed in a protective fluid and never exposed to the atmosphere and contamination, as by draining.

Another object of the invention is to provide a process and apparatus of the above character in which the food particles are not in motion but are static with the wash water flowing past them, thereby providing efficient washing and cooling of the particles without damage by motion of the particles or by stirrers.

Additional objects and features of the invention will be apparent from the following description in which the preferred embodiments are set forth in detail in conjunction with the accompanying drawings.

BRIEF DESCRIPTION OF THE DRAWING

FIG. 1 is a front elevational view of one embodiment of apparatus incorporating the present invention.

FIG. 2 is a cross-sectional view taken along line 2—2 in FIG. 1.

FIG. 7 is a flow diagram of a counter flow batch operation for washing and cooling food particles requiring only one volume of fresh water per batch of particles.

DESCRIPTION OF THE PREFERRED EMBODIMENT

Figure 3:
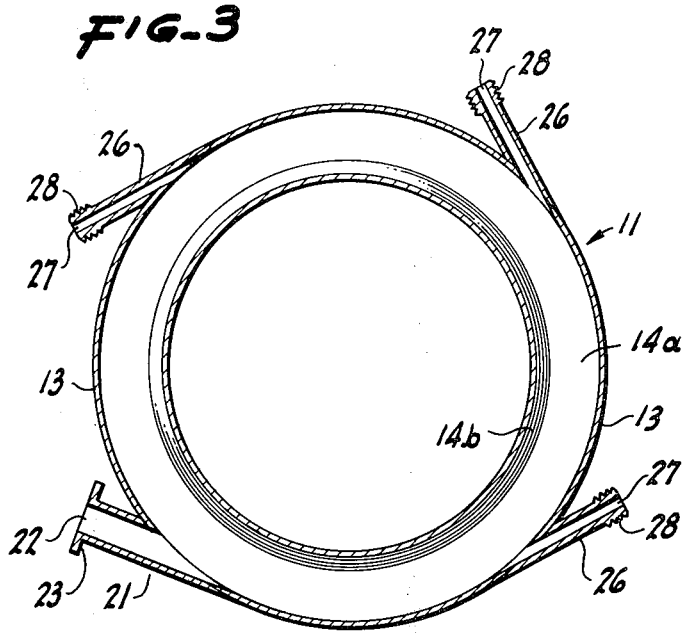
FIG. 3 is a cross-sectional view taken along line 3—3 of FIG. 1.

The embodiment shown in FIGS. 1–3 includes a tank 11 which is provided with supporting legs 12. In one preferred embodiment, the legs 12 are adjustable in length, permitting the tank to be mounted in a stable level position regardless of the contour of the surface upon which the legs rest.

The tank 11 includes a cylindrical side wall 13, a bottom wall 14, and a top wall 16. As illustrated, the contour of the side wall 13 is generally that of a right circular cylinder.

The bottom wall 14 is formed to include an annular outer portion 14a and a conically raised inner portion 14b. The conically raised portion 14b is disposed coaxially of the side wall 13 and extends into the region within the side wall.

The side wall 13 and bottom wall 14 cooperate to form a processing chamber 17, the lower portion of which is particularly adapted for receiving food particles.

The top wall 16 is formed to include an annular outer portion 16a and a cylindrically raised inner portion 16b. The top wall 16 provides means for closing the chamber 17 to prevent atmospheric air and contamination from entering the chamber. Thus, it is preferable that the top wall 16 be hermetically sealed to the side wall 13 and that the cylindrical portion 16b be hermetically sealed to the annular portion 16a. If desired, the top wall 16 can be removably mounted to the side wall 13 or the cylindrical portion 16b can be removably mounted to the annular portion 16a to facilitate cleaning of the interior of the tank.

Means is provided for introducing food particles into the lower portion of the chamber 17. This means includes a conduit 21 having a passageway 22 in communication with the lower portion of the chamber 17. The conduit 21 is attached to the side wall 13 of the tank by conventional means, such as welding. As can be best seen in FIG. 3, the passageway 22 is oriented generally in tangential alignment with the side wall 13. Flange means 23 or other suitable means is provided for connecting the conduit 21 to a suitable source of food particles. As is more fully discussed hereinafter, the conduit 21 also provides means for removing food particles from the lower portion of the chamber 17.

Fluid inlet means is provided for introducing washing fluid into the lower portion of the chamber 17. This means includes a plurality of nozzles or jets 26 which are mounted on the lower portion of the side wall 13 and spaced circumferentially thereof. The nozzles are attached to the side wall by conventional means, such as welding. Each of the nozzles is formed to include a passageway 27 which is in communication with the lower portion of the chamber 17. The nozzles 26 are oriented in such a manner that the passageways 27 are aligned substantially tangentially to the side wall 13. Threads 28 or other suitable means are provided on the outer ends of the nozzles 26 to provide means for connecting them to a source of washing fluid.

Fluid outlet means is provided for removing fluid above a predetermined level from the chamber 17. As illustrated, this means comprises a siphon tube 31 having an intake end 32 disposed within the chamber 17. The tube passes through an opening 33 formed in the cylindrical portion 16b of the top wall 16. The discharge end 34 of the tube is adapted for connection to conventional siphon means, such as a siphon pump. A conventional valve 35 is provided at the discharge end 34 for controlling the volume of flow through the tube 31.

Alternatively, if desired, the fluid outlet means can comprise one or more simple overflow drains disposed at a predetermined height in the side wall of the tank, or adjustable siphon.

Figure 4:
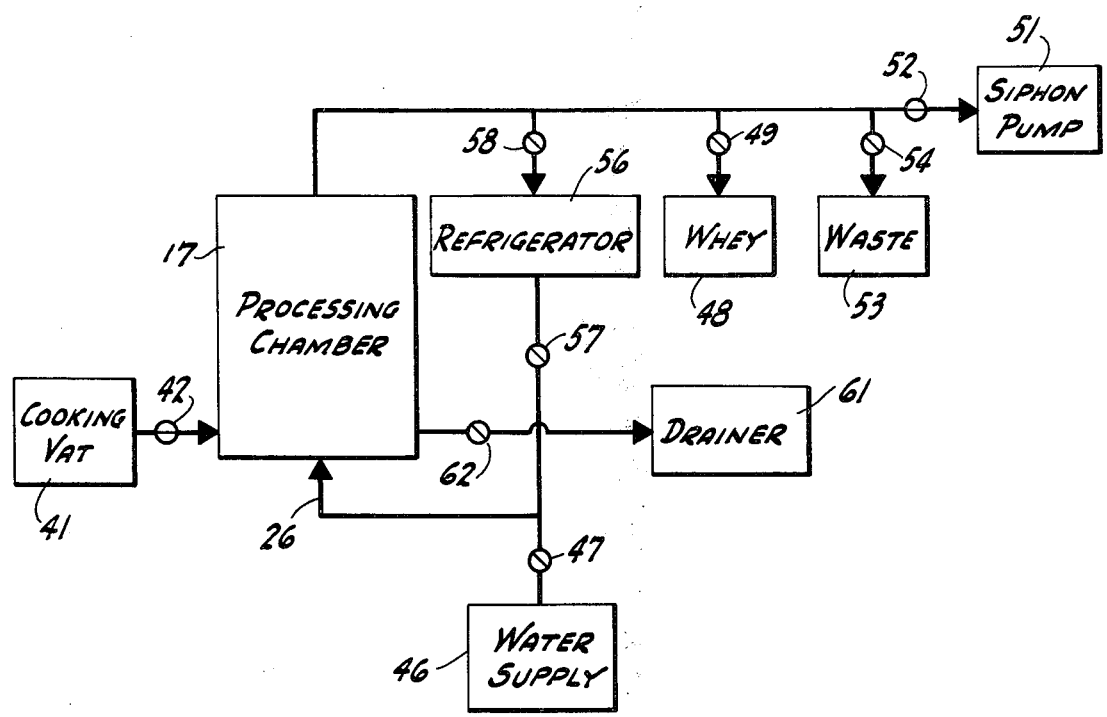
FIG. 4 is a flow diagram illustrating one embodiment of a process incorporating the present invention.

Operation and use of the embodiment shown in FIGS. 1–3 can now be described with reference to FIG. 4. Let it be assumed that the conduit 21 has been connected to a suitable source of cottage cheese curds and whey, such as a cooking vat 41, as illustrated in FIG. 4. Further, let it be assumed that a valve 42 is provided in the line connecting the cooking vat to the conduit and that the valve 42 is initially in its open position. Curds and whey can then be pumped or flowed by gravity into the lower portion of the chamber 17 through the conduit 21. Because of the tangential orientation of the conduit 21, the curds and whey tend to flow around the side wall 13 and are distributed evenly in the region intermediate the side wall 13 and conical portion 14b of the bottom wall. When the desired volume of curds and whey have been delivered to the chamber 17, the valve 42 is closed. The curds and whey are preferably delivered to the chamber in such manner that the whey overflows, leaving the curds in the chamber during filling. The flow rates are controlled in such manner that the whey flows upward at a rate slower than the settling rate of the curd particles. The curds in the chamber are designated by the reference numeral 43 in FIG. 2.

Initially, let it further be assumed that it is desired to further separate the curds from whey remaining in the voids and above the curd in the processing chamber 17. The nozzles 26 are connected to a suitable source of fluid, such as water supply 46 in FIG. 4, through a valve 47. When the valve 47 is opened, water is delivered to the lower portion of the chamber 17. Because of the orientation of the nozzles 26, this water flows around the chamber in a clockwise direction, as viewed in FIG. 3. The wash water, having a lesser density than the curds, tends to flow upwardly through the curds, displacing the whey ahead of it. It should be noted that even though gravitational force retains the curds in the lower portion of the chamber, the curds are not compacted together as they are in conventional systems where drainage occurs downwardly. The upward flow of the wash water separates the curds slightly, permitting the water to pass through them freely and uniformly. It has been found that particularly good results are obtained when the rate of flow of the wash water is made slightly less than the settling rate of the curd particles to be recovered.

The whey is removed from the chamber 17 through the siphon tube 31. For this purpose, the tube is connected to a suitable receiving tank, such as whey tank 48, through a valve 49. The siphoning action is initiated by a siphon pump 51 which is connected to the tube 31 through a valve 52. As soon as the siphoning action begins, the valve 52 is closed, and the whey is delivered to the tank 48. The whey removal continues until the level of the fluid in the chamber drops below the intake end 32 of the siphon tube. If the proper volume of water has been supplied to the processing chamber, substantially all of the whey will be delivered to the whey tank 48, and the whey in the tank 48 will be substantially free of wash water. When the whey has been removed from the chamber 17, the valve 49 is closed.

If further washing of the curds 43 is desired, additional water can be supplied to the chamber from the water supply 46. The used wash water is removed from the chamber and delivered to a waste tank 53 by the siphon tube 31. A valve 54 controls the flow to the tank 53.

Cooling of the curds 43 can be provided by washing them with washes at successively lower temperatures or by continuous washing with chill water or progressively colder water. This washing cooling can be accomplished by connecting additional supply tanks or other sources and valves to the nozzles 26. However, it has been found that excessive washing can detract from the flavor of the curds. Hence it may be desirable to cool and recycle some of the wash water, rather than using fresh water for each wash or for all of a continuous wash. In FIG. 4, a refrigerator 56 is shown connected to the nozzles 26 through a valve 57 and to the siphon tube 31 through a valve 58. When it is desired to recycle the wash water, the valve 58 is opened and the wash water is drained into the refrigerator 56, rather than into the waste tank 53. The cooled water is then recycled to the chamber 17 through the valve 57 and the nozzle 26. To further minimize dilution of the flavor of the curds and to minimize whey disposal, the displaced whey can be cooled and passed through the curds to provide initial cooling prior to the introduction of water.

When the washing and cooling steps have been completed, the washed curds are pumped or flowed out of the chamber 17 through the conduit 21 and delivered to additional processing equipment, such as a drainer 61. A valve 62 is provided intermediate the conduit 21 and drainer 61 for controlling the flow of curds from the chamber. It should be noted that the tangential orientation of the passageway 22 in the conduit 21 cooperates with a slight circular motion of the curds 43 set up during discharge to facilitate the removal of curds from the chamber 17.

Figure 5:
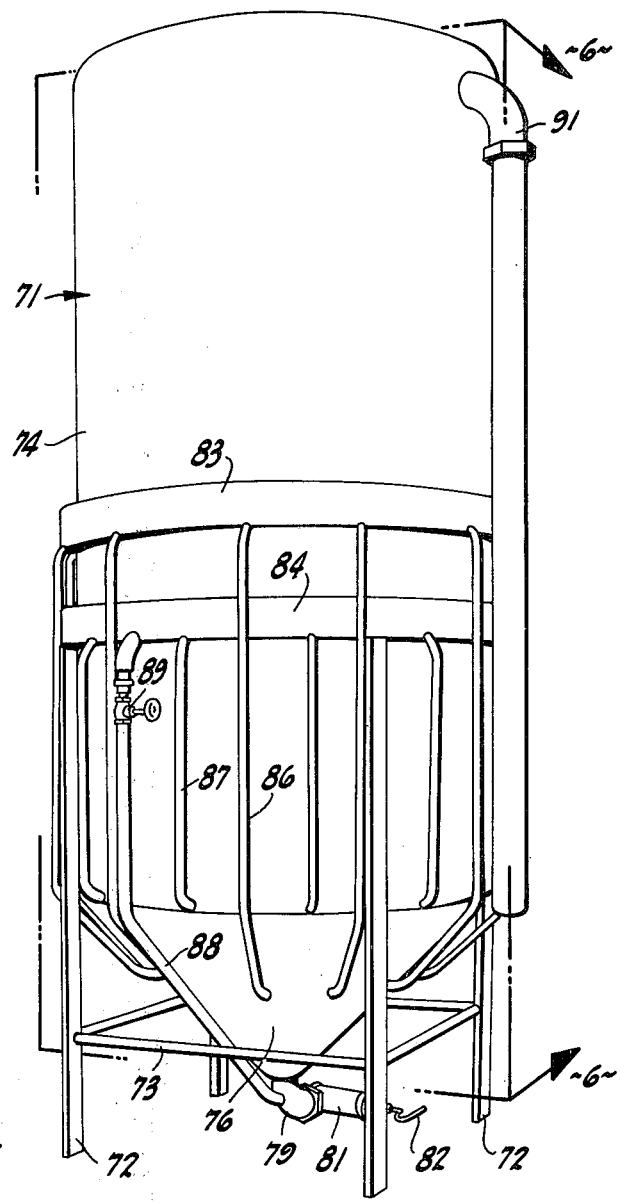
FIG. 5 is a perspective view of another embodiment of apparatus incorporating the present invention.
Figure 6:
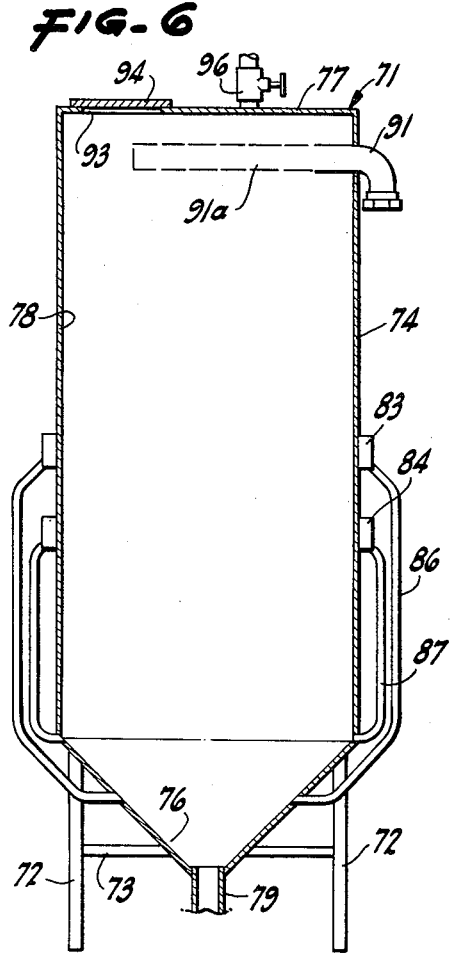
FIG. 6 is a sectional view of the apparatus shown in FIG. 5.

The embodiment illustrated in FIGS. 5 and 6 includes a tank 71 which is supported by legs 72. The legs are attached to the tank by suitable means, such as welding, and cross-braces 73 are provided between adjacent legs.

The tank 71 includes a cylindrical side wall 74, a downwardly extending conical bottom wall 76 and a top wall 77. In the preferred embodiment, these walls are fabricated of stainless steel, and they are joined together to form a hermetically sealed food processing chamber 78.

Means is provided for introducing food particles into and removing food particles from the lower portion of the chamber 78. This means includes a tubular member 79, one end of which is connected to the apex of the conical bottom wall 76. The other end of the tubular member is attached to a valve assembly 81. This valve assembly includes an actuating member 82 which provides selective control of the passage of food particles to and from the chamber 78.

Fluid inlet means is provided for introducing washing fluid into the lower portion of the chamber 78. This means includes manifold assemblies 83 and 84 which are mounted on the side wall 74. Suitable means is provided for connecting these manifolds to a pressurized source of washing and/or cooling fluid, such as water.

A plurality of circumferentially spaced apart header pipes 86 extend between the manifold assembly 83 and the bottom wall 76. These pipes provide means for introducing washing fluid into the chamber 78 intermediate the apex of the bottom wall and the junction between the bottom and side walls. A plurality of circumferentially spaced apart header pipes 87 extend between the manifold assembly 84 and the junction between the side and bottom walls. Thus, these pipes provide means for introducing streams of washing fluid into the chamber at a location higher than the pipes 86. If desired, flow passageways can be formed in the side wall of the tank behind the manifold assemblies to provide means for introducing fluid into the chamber at a level above the distal ends of the header pipes 86 and 87. A line 88 extends between the manifold assembly 84 and the food inlet 79. This line provides means for introducing additional water into the bottom portion of the chamber 78 simultaneously with the food particles to lower their entry temperatures. A valve 89 is provided for controlling the amount of fluid introduced through the line 88.

Fluid outlet means is provided for removing fluid above a predetermined level from the chamber 78. This means includes a drain pipe member 91 which extends through an opening in the upper portion of the side walls 74. A strainer 91a is provided at the intake end of the drain pipe member as an overflow safety device which would retain solids in the event air were admitted in fluids entering the bottom, or to retain any floating or bouyed up solids.

The top wall 77 is formed to include an opening 93 which is provided with a removable cover 94 which may be sealed. The opening 93 provides means for access to the interior of the tank for purposes such as cleaning. In normal operation of the apparatus, the cover 94 is closed tightly or sealed.

If desired, purging fluids, such as chlorinated or filtered air, can be introduced into the chamber 78 to insure that the atmosphere within the chamber remains sterile and free from microbial contamination. A valve 96 is mounted on the top wall 77 to provide means for controlling the passage of such fluids.

Operation and use of the embodiment of FIGS. 5 and 6 for a process such as the washing and cooling of cottage cheese curds can now be described briefly. Initially, the valve 81 is positioned such that cooked curds and whey can be pumped into the lower portion of the chamber 78 from a suitable source such as a cooking vat. While the curds and whey are being pumped into the chamber, water can be added through the pipes 86 and 87 and the line 88 to cool the entering flow and prevent the settling of hot curd particles around the periphery of the conical bottom wall, thus preventing caking during filling. During the filling operation, whey is permitted to overflow through the drain pipe 91. After the desired quantity of curds and whey have been pumped into the chamber, the valve 81 is closed, and a suitable volume of washing fluid is introduced into the chamber 78 through the manifold/header pipe assemblies to displace the whey upwardly and out through the drain pipe 91. The washing fluid is preferably introduced at a rate less than the settling rate of the curds. Additional washes or volumes of fluid can be introduced into the chamber 78 through the manifold, header assemblies and passed upwardly through the curds and drained out through the pipe 91 in batches or a continuous flow. If desired, the successive washes or wash periods in a continuous wash, can be made with fluids including whey as well as water, for example, at progressively lower temperatures, and a given volume of fluid can be cooled, used, recovered, re-cooled and used again to reduce waste. When the desired number of cooling and/or washing operations have been completed, the valve 81 is again opened, and the washed curds are pumped or flowed out of the chamber to suitable equipment for subsequent processing and/or packaging. If desired, air can be introduced into the chamber through the manifold/header pipe assemblies to improve the out flow of curd.

FIG. 7 illustrates a counter-flow operation for washing and cooling cottage cheese curd requiring only one volume of fresh water per batch of cottage cheese. This operation is carried out in a system comprising a single washing and cooling unit 101 of the type described above and wash recovery storage tanks 102, 103 and 104. While only one washing and cooling unit is required, this unit is shown five times in FIG. 7 to illustrate different phases of the operation.

In the operation illustrated in FIG. 7, a batch of curds and whey is pumped into the bottom of a washing and cooling unit 101 from a cooking vat 106. Recovered fluid from the tank 102 is then pumped into the bottom of the washer/cooler and displaces the whey from the unit. The displaced whey is carried to a whey tank or otherwise disposed of. A second wash is introduced into the bottom of the washer/cooler from the tank 103, and the displaced liquid containing much whey is discarded or sent to the whey tank. Thereafter, another wash is introduced into the bottom of the washer/cooler from the tank 104, and this time the displaced fluid is stored in the tank 102 for use in processing a subsequent batch of curds. Fresh water is then introduced into the bottom of the washer/cooler, and the displaced fluid is stored in the tank 103 for use with a subsequent batch. The fresh water and curd are then drained from the washer/cooler into a closed drainer/mixer 107 or other drainer where the water is removed from the curd. This water is stored in the tank 104 for use in processing subsequent batches. Cream dressing and other additives are combined with the drained curd, as desired, in the drainer/mixer for a closed process or in another creamer to form the final product. The next batch of curds and whey is then pumped into the washer/cooler 101 from the cooking vat, and the operation repeats.

In one preferred embodiment, the washer/cooler has the capacity on the order of 900 gallons and each of the tanks 102–104 has a capacity on the order of 600 gallons. In this embodiment, only one 600 gallon volume of fresh water is required for each batch of curds processed. If desired, the tanks 102–104 can be refrigerated, or the temperature of the washing/cooling water can otherwise be reduced to provide cooling of the curd. While three separate washing steps are provided in the operation described, a different number of such steps can be used if desired.

While the process and apparatus of the present invention have been described with specific reference to cottage cheese processing, it will be appreciated that they are equally applicable to other food products, such as macaroni, rice and vegetables. Likewise, fluids other than water can be used as the washing fluid. For example, chlorinated water or a flavored or acidified water can be used. Likewise, water treatment such as that used in the hydration or purification of foods can be used.

Although each of the embodiments described has a generally cylindrical tank with a conical bottom wall, the tank can be formed in other shapes if desired. Thus, for example, the tank can have rectangular or square side walls and a pyramidal bottom wall.

It is apparent from the foregoing that a new and improved process and apparatus for separating and washing food products has been provided. The process is carried out in a closed chamber from which atmospheric air and contamination are readily excluded, and the food is kept immersed. It provides complete separation of solid and liquid food products without the loss of fine food particles. The separation, washing and cooling are carried out without stirring and essentially without motion of the food particles, thereby minimizing damage to and breakage of the particles. Complete and efficient washing is provided since the solid particles are not compacted together, and the use of successively cooler washing fluids in intimate, distributed contact with the particles provides an efficient method for cooling them. By using the washing fluid for successive batch operations, waste disposal is minimized or eliminated. While only the presently preferred embodiments have been described, as will be apparent to those familiar with the art, certain changes and modifications can be made without departing from the scope of the invention as defined by the following claims.

I claim:

1. In a process for washing and cooling cooked cottage cheese curd utilizing an upright tank having an enclosed washing chamber with a cylindrical side wall and a downwardly extending conical bottom wall, disposed coaxially of the side wall with an inlet and outlet passageway at the apex of the bottom wall, the steps of introducing a first batch of cooked curds and whey into the chamber through the passageway at the apex of the bottom wall of the tank, introducing liquid from a storage tank into the lower portion of the chamber through a plurality of inlets in the bottom wall to displace the whey upwardly and out of the chamber near the top of the tank, introducing fresh water into the lower portion of the chamber to displace the liquid upwardly and out of the chamber near the top of the tank, storing the displaced liquid, discharging the first batch of curd through the passageway at the apex of the bottom wall of the tank, introducing a second batch of curd into the bottom of the chamber through the passageway at the apex of the bottom wall and passing the stored liquid upwardly through the second batch of curd in the chamber through said plurality of inlets.

2. A process as in claim 1 together with the additional step of cooling the stored liquid.

3. A process as in claim 1 wherein the liquid introduced from the storage tank includes whey at a temperature lower than the temperature of the whey it displaces.

4. In a process for washing cottage cheese curd utilizing an upright enclosed tank having a cylindrical side wall and a bottom wall with a conically raised central portion disposed coaxially of the side wall and an annular outer portion at the bottom of the tank between the raised portion and the lower portion of the side wall, the steps of: introducing curd in a direction tangential to the tank side wall into the annular outer portion of the tank through an inlet passageway tangential to the cylindrical side wall in the lower portion of the side wall, introducing a washing fluid into the lower portion of the tank in a direction generally tangential to the side wall, passing the washing fluid upwardly through the curd, removing the washing fluid from near the top portion of the tank, and discharging the washed curd from the annular outer portion at the bottom of the tank in a direction generally tangential to the side wall.

5. In a process for washing cottage cheese curd utilizing an upright tank having an enclosed washing chamber with a cylindrical side wall and a downwardly extending conical bottom wall disposed coaxially of the side wall with an inlet and outlet passageway at the apex of the bottom wall, the steps of: introducing curd into the chamber through the passageway at the apex of the bottom wall of the tank, introducing a washing fluid from outside the tank into the lower portion of the chamber through a plurality of inlets in the bottom wall, passing the washing fluid upwardly through the curd, removing the washing fluid from near the top of the chamber, and discharging the washed curd through the passageway at the apex of the bottom wall.

6. A process as in claim 5 wherein the fluid is passed through the curd at a rate less than the rate at which the curd settles.

7. A process as in claim 5 together with the additional steps of passing additional washing fluid at a second temperature upwardly through said curd and removing said additional washing fluid from the upper portion of said chamber.

8. A process as in claim 5 together with the additional steps of cooling the washing fluid after it is removed from the chamber, passing the cooled fluid upwardly through the curd, and removing said cooled fluid from the upper portion of said chamber.

9. A process as in claim 5 curds together with the additional step of passing cooled whey upwardly through the curd before washing fluid is passed through said curd.

* * * * *